United States Patent
Sosnovskiy

(10) Patent No.: US 9,746,558 B2
(45) Date of Patent: Aug. 29, 2017

(54) PROXIMITY SENSOR APPARATUS FOR A GAME DEVICE

(75) Inventor: Vladimir Sosnovskiy, North Hollywood, CA (US)

(73) Assignee: Mattel, Inc., El Segundo, CA (US)

( * ) Notice: Subject to any disclaimer, the term of this patent is extended or adjusted under 35 U.S.C. 154(b) by 972 days.

(21) Appl. No.: 13/330,876

(22) Filed: Dec. 20, 2011

(65) Prior Publication Data

US 2012/0158353 A1 Jun. 21, 2012

Related U.S. Application Data

(60) Provisional application No. 61/425,128, filed on Dec. 20, 2010.

(51) Int. Cl.
*G01S 17/06* (2006.01)
*G01S 17/87* (2006.01)

(52) U.S. Cl.
CPC ............... *G01S 17/06* (2013.01); *G01S 17/87* (2013.01)

(58) Field of Classification Search
CPC .................................. G01S 17/06; G01S 17/87
USPC ......................................................... 702/150
See application file for complete search history.

(56) References Cited

U.S. PATENT DOCUMENTS

| | | |
|---|---|---|
| 4,207,466 A | 6/1980 | Drage et al. |
| 4,479,053 A | 10/1984 | Johnston |
| 4,564,756 A | 1/1986 | Johnson |
| 4,574,197 A | 3/1986 | Kliever |
| 4,628,493 A | 12/1986 | Nelson et al. |
| 4,701,610 A | 10/1987 | Hoogenboom |
| 4,716,430 A | 12/1987 | Stauffer |
| 4,888,490 A | 12/1989 | Bass et al. |
| 4,910,464 A | 3/1990 | Trett et al. |
| 4,939,439 A | 7/1990 | Dalglish |
| 4,991,966 A | 2/1991 | Raymond |
| 5,103,085 A | 4/1992 | Zimmerman |
| 5,308,985 A | 5/1994 | Lee |
| 5,393,978 A | 2/1995 | Schwarz |
| 5,440,114 A | 8/1995 | Barbier et al. |
| 5,583,339 A | 12/1996 | Black et al. |
| 5,677,529 A | 10/1997 | Hofmann et al. |
| 5,680,489 A | 10/1997 | Kersey |
| 5,717,203 A | 2/1998 | Yung |
| 5,825,481 A * | 10/1998 | Alofs ...................... G01S 3/783 356/138 |
| 5,991,040 A | 11/1999 | Doemens et al. |
| 6,175,309 B1 | 1/2001 | Drake et al. |
| 6,246,045 B1 | 6/2001 | Morris et al. |
| 6,844,538 B1 | 1/2005 | Hollock et al. |
| 7,009,378 B2 | 3/2006 | Blake et al. |

(Continued)

FOREIGN PATENT DOCUMENTS

| | | | |
|---|---|---|---|
| JP | 5340810 A | 12/1993 | |
| JP | 10246669 A | 9/1998 | |

*Primary Examiner* — Stephanie Bloss
(74) *Attorney, Agent, or Firm* — Edell, Shapiro & Finnan, LLC

(57) ABSTRACT

A proximity sensing apparatus includes a device housing, a plurality of energy emitters, an energy detector, a reflective member, and a controller system. The proximity sensing apparatus channels reflected energy to the energy detector and determines the location of the source of reflection. The channeling of energy to the energy detector may reduce manufacturing costs by utilizing less hardware while maintaining a high level of reliability.

19 Claims, 12 Drawing Sheets

(56) References Cited

U.S. PATENT DOCUMENTS

| | | | |
|---|---|---|---|
| 7,053,374 B2 | 5/2006 | Barone | |
| 7,155,308 B2 | 12/2006 | Jones | |
| 7,221,815 B2* | 5/2007 | Smith | H04J 14/02 385/13 |
| 7,269,478 B2 | 9/2007 | Fukuchi et al. | |
| 7,348,538 B2* | 3/2008 | Twiney | G01V 8/10 250/221 |
| 7,397,386 B2 | 7/2008 | Sibalich et al. | |
| 7,485,842 B2 | 2/2009 | Bich et al. | |
| 7,564,031 B2 | 7/2009 | Fine et al. | |
| 7,684,016 B1 | 3/2010 | Schaefer | |
| 7,714,265 B2 | 5/2010 | Fadell et al. | |
| 8,239,992 B2* | 8/2012 | Schnittman | A47L 11/34 15/319 |
| 2004/0099790 A1 | 5/2004 | Knee et al. | |
| 2004/0151345 A1* | 8/2004 | Morcom | G01S 7/487 382/104 |
| 2004/0247246 A1 | 12/2004 | Lee et al. | |
| 2005/0281505 A1 | 12/2005 | Smith | |
| 2006/0038115 A1 | 2/2006 | Maas | |
| 2007/0103550 A1* | 5/2007 | Frank | G01S 17/50 348/154 |
| 2007/0268366 A1 | 11/2007 | Raskar et al. | |
| 2008/0006762 A1 | 1/2008 | Fadell et al. | |
| 2008/0091304 A1 | 4/2008 | Ozick et al. | |
| 2008/0191864 A1* | 8/2008 | Wolfson | 340/524 |
| 2008/0276407 A1* | 11/2008 | Schnittman | A47L 11/34 15/319 |
| 2009/0046356 A1* | 2/2009 | Sakaue et al. | 359/360 |
| 2009/0228165 A1 | 9/2009 | Ozick et al. | |

* cited by examiner

PROXIMITY SENSOR APPARATUS FOR A GAME DEVICE

CROSS-REFERENCE TO RELATED APPLICATIONS

This application claims priority under 35 U.S.C. §119 to U.S. Provisional Patent Application Ser. No. 61/425,128, filed Dec. 20, 2010, and entitled PROXIMITY SENSOR APPARATUS FOR A GAME DEVICE, the complete disclosure of which is incorporated herein by reference for all purposes.

FIELD OF THE INVENTION

The disclosure relates generally to a proximity sensor. More specifically, the proximity sensor may be used in a game device.

BACKGROUND

Memory skills games have been and continue to be an ample source of education and amusement for children. Enhancements and features that spark a child's imagination and provide continued engagement of the game with the child add to its play value.

One touchstone memory skills game device is SIMON by MILTON BRADLEY. The device includes four colored buttons, each of which produces a tone when pushed. One method of game play includes lighting up one or more of the buttons in a particular order, after which the player must reproduce the order by pressing the buttons. While the game play is engaging, the manner in which the player interacts with the device is limited. Extended and repeated physical contact with the device may lead to rapid degradation of key parts.

Another memory skills game device is the LOOPZ game by MATTEL. The device includes four illuminated U-shaped areas. The device produces a tone when a beam of light in a particular U-shaped area is broken, such as when a player's hand passes between the prongs of the "U". One method of game play includes the device lighting up one or more of the U-shaped areas in a particular order, after which the player must reproduce the order by passing a hand through the U-shaped areas. Again, the game play is engaging, but the device uses a proportional number of sensors to interaction areas, which may lead to higher manufacturing costs. A variant of LOOPZ is the TAPZ reflex game, also by MATTEL, which is described in more detail in U.S. patent application Ser. No. 13/219,407, the complete disclosure of which is incorporated herein by reference for all purposes.

U.S. Pat. No. 7,155,308 ("Jones") discloses a robot obstacle detection system. The robot obstacle detection system includes a robot housing which navigates with respect to a surface and a sensor subsystem having a defined relationship with respect to the housing and aimed at the surface for detecting the surface. The sensor subsystem includes an optical emitter and a photon detector having a defined field of view which intersects the field of emission of the emitter at a region. Like the LOOPZ game, the Jones system uses a proportional number of sensors to emitters, which may lead to higher manufacturing costs.

U.S. Pat. No. 5,308,985 ("Lee") discloses a wide-angle passive infrared radiation detector. The infrared radiation detector uses a reflector comprising a mirrored conic section or faceted reflector to increase the field of view of a sensor. The Lee detector is a passive system that merely detects whether an object, such as an intruder, is present within its entire field of view. The Jones and Lee references are both herein incorporated by reference in full.

SUMMARY

The disclosure includes a proximity sensing apparatus. The proximity sensing apparatus may include a device housing, a plurality of energy emitters, an energy detector, a reflective member, and a controller system. The proximity sensing apparatus channels reflected energy to the energy detector and determines the location of the source of reflection.

Other systems, methods, features and advantages will be, or will become, apparent to one with skill in the art upon examination of the following figures and detailed description. All such additional systems, methods, features and advantages are included within this description, are within the scope of the claimed subject matter, and are protected by the following claims.

BRIEF DESCRIPTION OF THE DRAWINGS

The proximity sensing apparatus may be better understood with reference to the following drawings and description. The elements in the figures are not necessarily to scale, emphasis instead being placed upon illustrating the principles of the proximity sensing apparatus. In the figures, like-referenced numerals designate corresponding parts throughout the different views.

DETAILED DESCRIPTION

A proximity sensing apparatus includes a device housing, a plurality of energy emitters, an energy detector, one or more reflective members, and a controller system. The proximity sensing apparatus may be configured to control the energy emissions and to channel reflected energy to the energy detector such that it may determine the location of the source of reflection. With a reduced number of energy detectors, a manufacturing cost savings may be realized.

Figure 1:
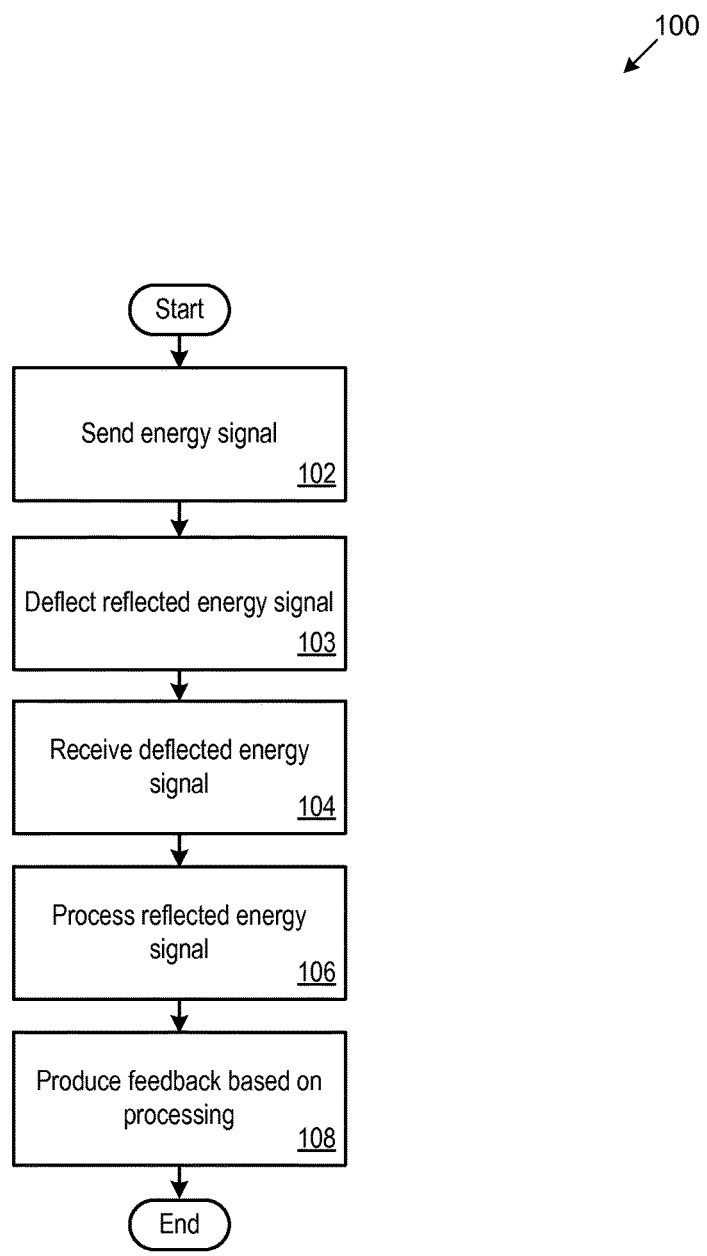
FIG. 1 is a flowchart of a process of sensing one or more objects within a particular proximity of an apparatus.

FIG. 1 is a flowchart 100 of a process of sensing one or more objects within a particular proximity of an apparatus. The process begins by sending an energy signal 102. A controller system may send a control signal to an energy emitter on or about the apparatus that instructs the energy emitter to send the energy signal. The energy signal may include properties that make it identifiable from the energy signals of other energy emitters. The energy signal may reflect off one or more objects within a particular proximity of the apparatus and return to the apparatus. The objects may be under surveillance or potential obstacles to be avoided. In some embodiments, the objects may be one or more fingers, a hand, or other human appendage.

The reflected energy signal may further deflect off a reflective member 103, such as a reflective cone. The particular proximity may not be a set value. Rather, the particular proximity may depend on various factors including the strength of the emitted energy signal and the strength of the reflection off the object. The particular proximity may instead be a desired value. Anticipating that the object will be the skin of a hand and a desired proximity is a particular value, one of ordinary skill in the art may adjust the strength of the emitted energy signal to achieve the desired proximity for detection, for example.

The deflected reflected energy signal is received 104. An energy detector may receive the reflected energy signal that was deflected off the reflective member. The reflective energy may travel a path that includes more than one reflective member. The energy detector may communicate with a controller system. The reflected energy signal is processed 106. The controller system may process the data gathered by the energy detector about the received energy signal. For example, the controller system may compare the data against timing data for the energy emitters, or it may decode the data. Feedback based on the processing is produced 108. The controller system may signal an indicator, such as an LED or a loudspeaker, to communicate to a player that an energy signal was received from a particular sector around the apparatus, or that an energy signal was received from a particular energy emitter. Such a process may be useful for game play on a game device similar to that for the SIMON memory skills device. During such game play, a game player may place a finger or their hand in a sector around the game device to indicate a selection, rather than pushing a button.

Figure 2:
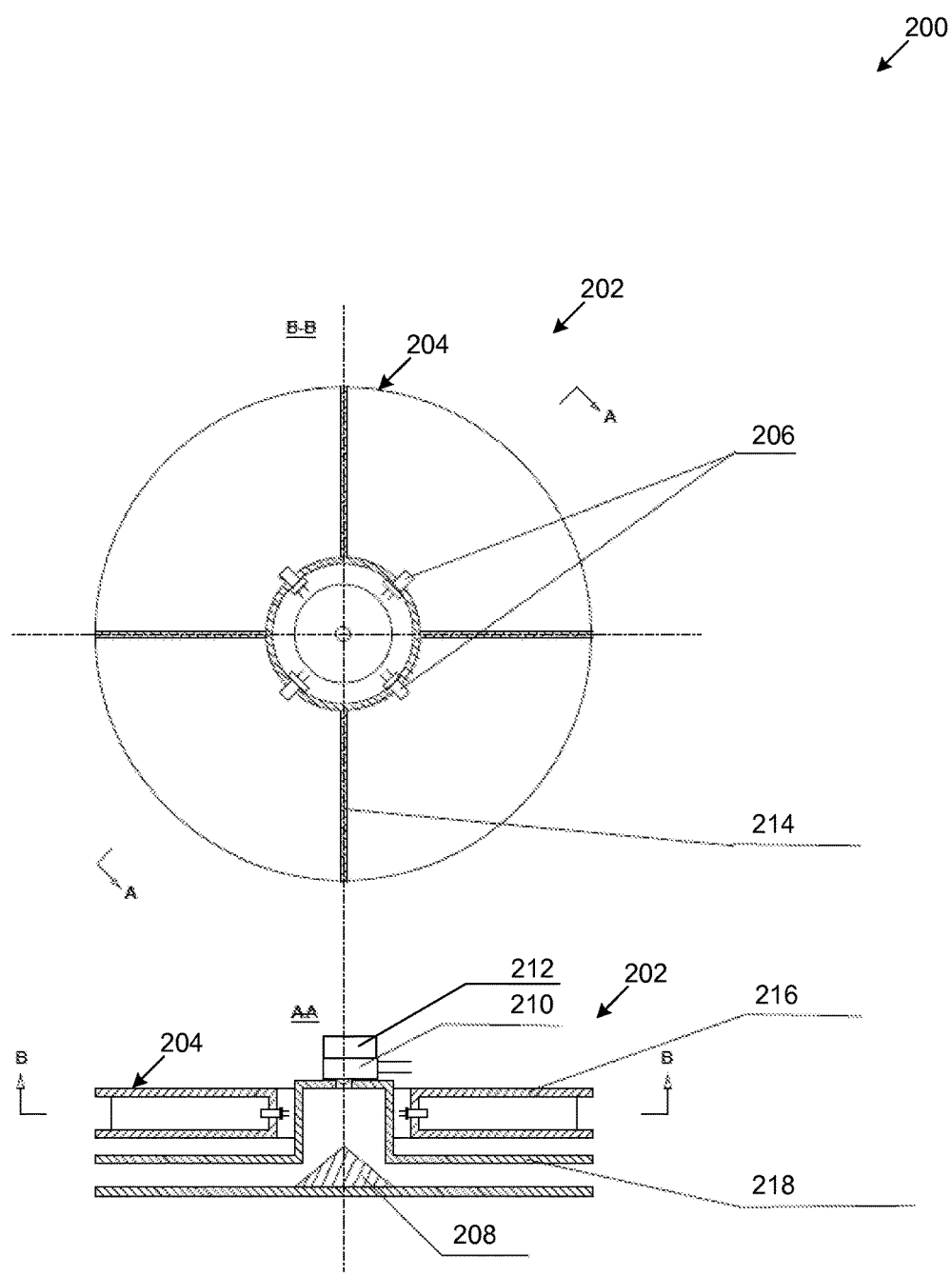
FIG. 2 is a schematic of an embodiment of a proximity sensing apparatus.

FIG. 2 is a schematic 200 of an embodiment of a proximity sensing apparatus 202. The proximity sensing apparatus 202 includes a device housing 204, a plurality of energy emitters 206, a reflective member 208, an energy detector 210, and a controller system 212. The device housing 204 provides the structural support for the proximity sensing apparatus 202. The device housing 204 may be manufactured from a durable plastic, such as polyvinyl chloride (PVC). The device housing 204 may include various structural features. The structural features may include opaque walls 214 that divide the proximity sensing apparatus 202 into sectors. The illustrative embodiment includes four opaque walls 214 that divide the proximity sensing apparatus 202 into four equal-area sectors or quadrants. By conceptually extending the opaque walls 214 into the space surrounding the proximity sensing apparatus 202, these opaque walls 214 may also divide the area surrounding the proximity sensing apparatus 202 into sectors. For example, the opaque walls 214 forming the four equal-area sectors may be conceptually extended to divide the space surrounding the proximity sensing apparatus 202 into four sectors.

The structural features may also include one or more collimators. The collimators may adapt the size and angle of a beam of radiation or particles or aid in collecting a beam of radiation or particles. The illustrative embodiment includes an emission collimator 216 for each energy emitter 206. The emission collimator 216 may aid in directing the angle of a beam of energy away from the energy emitter 206 and out to a particular sector of space adjacent to the proximity sensing apparatus 202. The illustrative embodiment also includes a reception collimator 218. The reception collimator 218 may aid in collecting a reflected beam of energy from a particular sector of space adjacent to the proximity sensing apparatus 202. Some embodiments include a reception collimator 218 for each sector of space adjacent the proximity sensing apparatus 202.

The energy emitters 206 direct energy into the space surrounding the proximity sensing apparatus 202. Each energy emitter may direct energy of a particular frequency, amplitude, or energy level into that space. For example, the emitted energy may be directed into a particular sector of space surrounding the proximity sensing apparatus 202. The emitted energy may be aided in its direction by particular structures in the device housing 204, such as the opaque walls 214 and the emission collimator 216.

The energy may be directed according to a pre-determined frequency, amplitude, energy, or timing pattern. The pattern may aid in identifying from which of the energy emitters 206 or from which particular sector of space a received energy pattern originated. For example, the pattern may include a time-division pattern or a code-division pattern.

Figure 3:
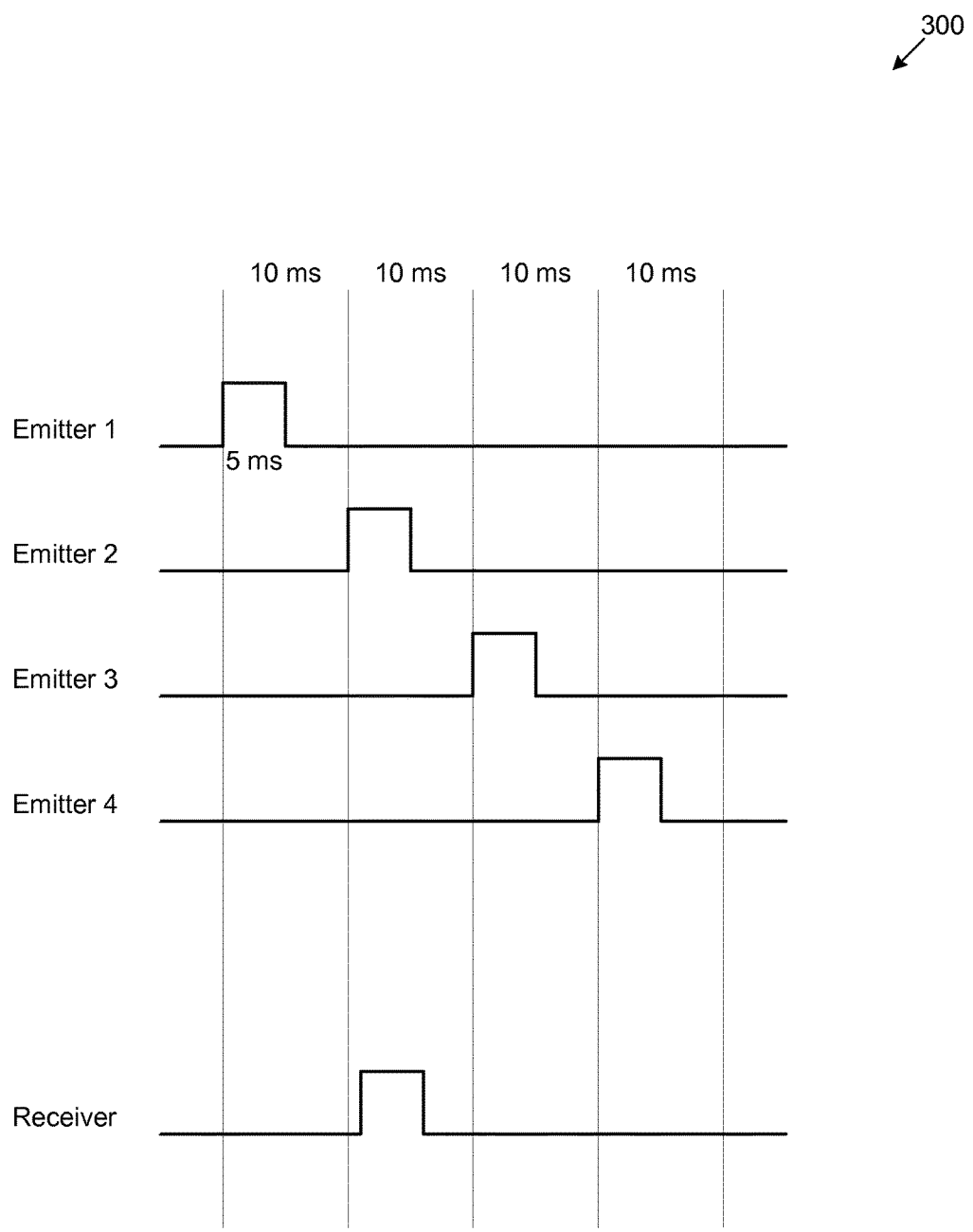
FIG. 3 is a timing diagram for an illustrative time-division pattern.

FIG. 3 is a timing diagram 300 for an illustrative time-division pattern. In a time-division pattern, the energy emitters 206 may be activated sequentially, and a received energy pattern may be associated with the particular energy emitter that was active at the time of reception. For example, a first energy emitter (Emitter 1) may be activated for five milliseconds during a first ten-millisecond cycle, but otherwise left un-activated. Similarly, a second energy emitter (Emitter 2) may be activated for five milliseconds during a second ten-millisecond cycle, a third energy emitter (Emitter 3) for a portion of a third cycle, and a fourth emitter (Emitter 4) for a fourth cycle. Should an energy receiver (Receiver) receive an energy pattern during the second cycle, the conclusions may be drawn that (1) it received the energy pattern emitted by the second energy emitter and that (2) the received energy pattern was reflected back to the energy receiver from a second sector of space.

In an illustrative code-division pattern, each of the energy emitters 206 may be activated according to an assigned pattern particular to that emitter. For example, one energy emitter may be activated according to the binary pattern [1 0 1 0], while a second energy emitter may be activated according to the binary pattern [0 1 0 1], a third according to [0 1 1 0], and a fourth [1 0 0 1]. Thus, the reception of the pattern [0 1 0 1] would indicate that (1) it originated from the second energy emitter and that (2) it was reflected back to the energy receiver from a second sector of space. The code-division patterns may be synchronized with a common code header.

In some embodiments, the energy emitters 206 are infrared emitters. An infrared emitter may emit energy at a frequency of around 38 kHz. An exemplary infrared emitter includes an IE-0545HP infrared LED from WAITRONY OPTOELECTRONICS. Alternatively, the energy emitters 206 may emit energy of another optical bandwidth, such as ultraviolet or near-ultraviolet light, or of sonic or ultrasonic energy, among other things.

The reflective member 208 directs energy to the energy detector 210. The reflective member 208 may be generally conic in shape and composed of or coated with a reflective material. In the embodiments of the invention with optical energy emitters, such as infrared emitters, the surface of the reflective member 208 may be coated with aluminum or MYLAR biaxially-oriented polyethylene terephthalate polyester film from DUPONT, or composed of a shiny plastic. The shape of the reflective member 208 may be engineered to maximize the amount of energy reflected to the energy detector 210 based on the anticipated angles of incidence to the conic surface. For example, a conic surface may be desirable to direct energy from a generally 360° planar field-of-view generally parallel to the base of the cone. In the illustrative embodiment, a reflective cone directs energy funneled by one of the reception collimators 218 to the energy detector 210 regardless of from which sector of space adjacent the proximity sensing apparatus 202 the energy was reflected. As illustrated, the reflective member 208 is a right circular cone whose axis passes through the main detection surface of the energy detector 210.

The shape of the reflective member 208 may be tailored to the application of the device. For example, where a generally 180° planar field-of-view is desired, one-half of a reflective conic surface may be utilized. For systems where the anticipated incidence angle is within a narrow range, a more planar reflective surface may be utilized. Other shapes, such as elliptical, hyperbolic, or segmented, may be desirable for the reflective member 208 based on the application of the device.

The energy detector 210 converts received energy into electrical signals sent to the controller system 212. The energy detector 210 may detect energy of a particular frequency, amplitude, or energy level incident on a detecting surface. In some embodiments, the energy detector 210 includes an infrared sensor. An infrared sensor may detect energy with a frequency of around 38 kHz. An exemplary infrared sensor includes a PIC-2T26ASMB infrared sensor from WAITRONY OPTOELECTRONICS. Alternatively, the energy detector 210 may detect energy of another optical bandwidth, such as ultraviolet or near-ultraviolet light, or detect sonic or ultrasonic energy, among other things.

The controller system 212 controls the operation of the proximity sensing apparatus 202. The controller system 212 may send signals to the energy emitters 206 to control energy emission patterns. The controller system 212 may receive signals from the energy detector 210 regarding detected energy. The controller system 212 may process the received signals from the energy detector 210 to determine from which sector of space adjacent the proximity sensing apparatus 202 the detected energy reflected or from which energy emitter the detected energy originated. The controller system 212 may send signals to a feedback system to provide a player with feedback regarding the determination made by the controller system 212. In some embodiments, the controller system 212 includes a microprocessor. In the illustrative embodiment, the controller system 212 includes a GPC11024A microcontroller from GENERALPLUS TECHNOLOGY. Alternatively, the controller system 212 may include a FPGA, EPROM, DSP, CPU, processor, IC, circuit or circuit board, or system-on-a-chip solution.

Figure 4:
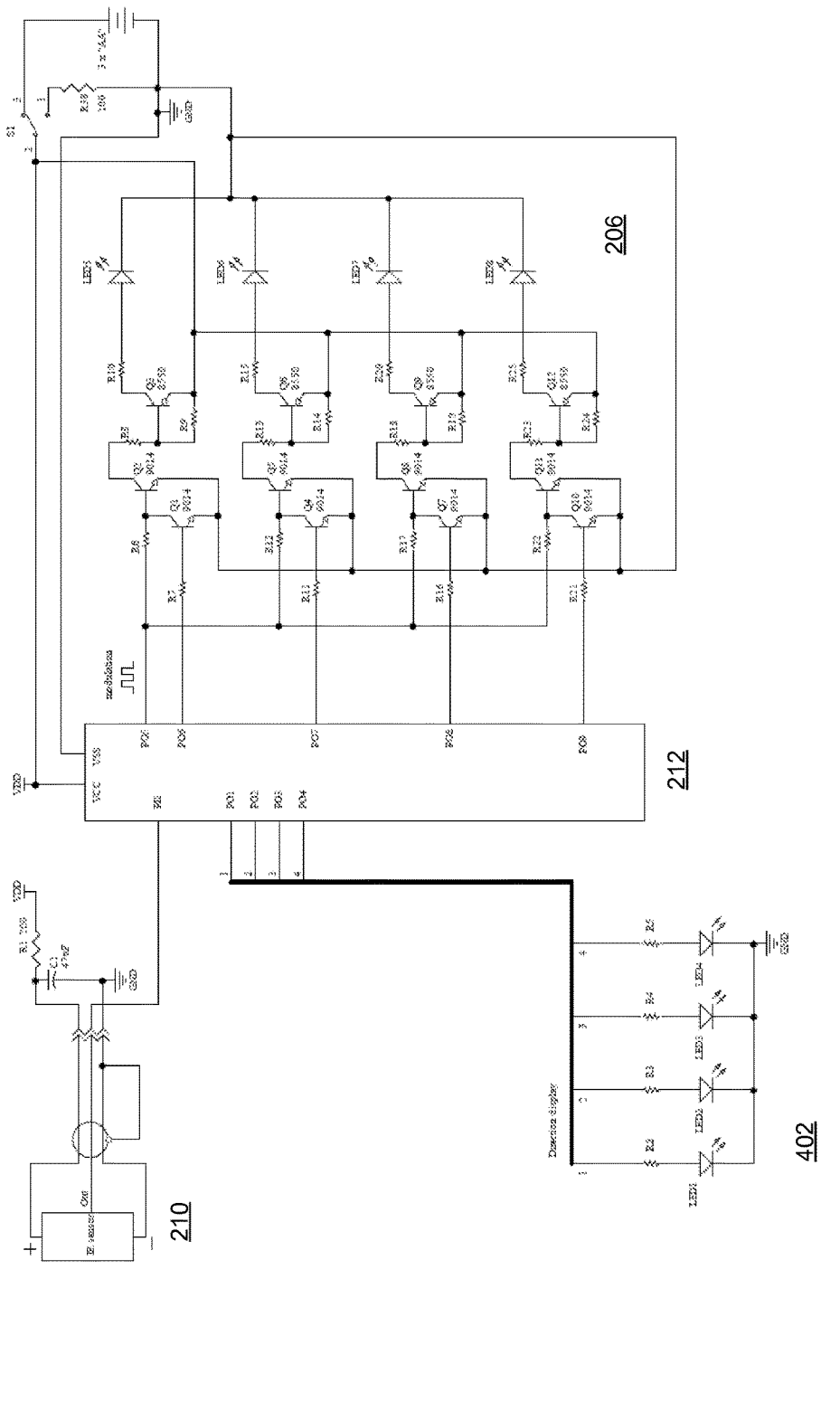
FIG. 4 is a circuit diagram for an exemplary optical proximity sensor apparatus.

FIG. 4 is a circuit diagram 400 for an exemplary optical proximity sensor apparatus. The circuit diagram 400 includes the energy emitters 206, the energy detector 210, the controller system 212, and a feedback system 402. The energy emitters 206 in this embodiment include four infrared (IR) light-emitting diodes (LEDs) connected through an electrical circuit to the controller system 212. The energy detector 210 includes an IR sensor connected through an electrical circuit to the controller system 212. The controller system 212 includes a microprocessor connected through an electrical circuit to the feedback system 402. The feedback system 402 includes a detection display with four green, bright, surface-mounted LEDs. Each LED may be mounted on a different sector of an exterior of a device housing such that the activation of the LED indicates a particular sector.

Figure 5:
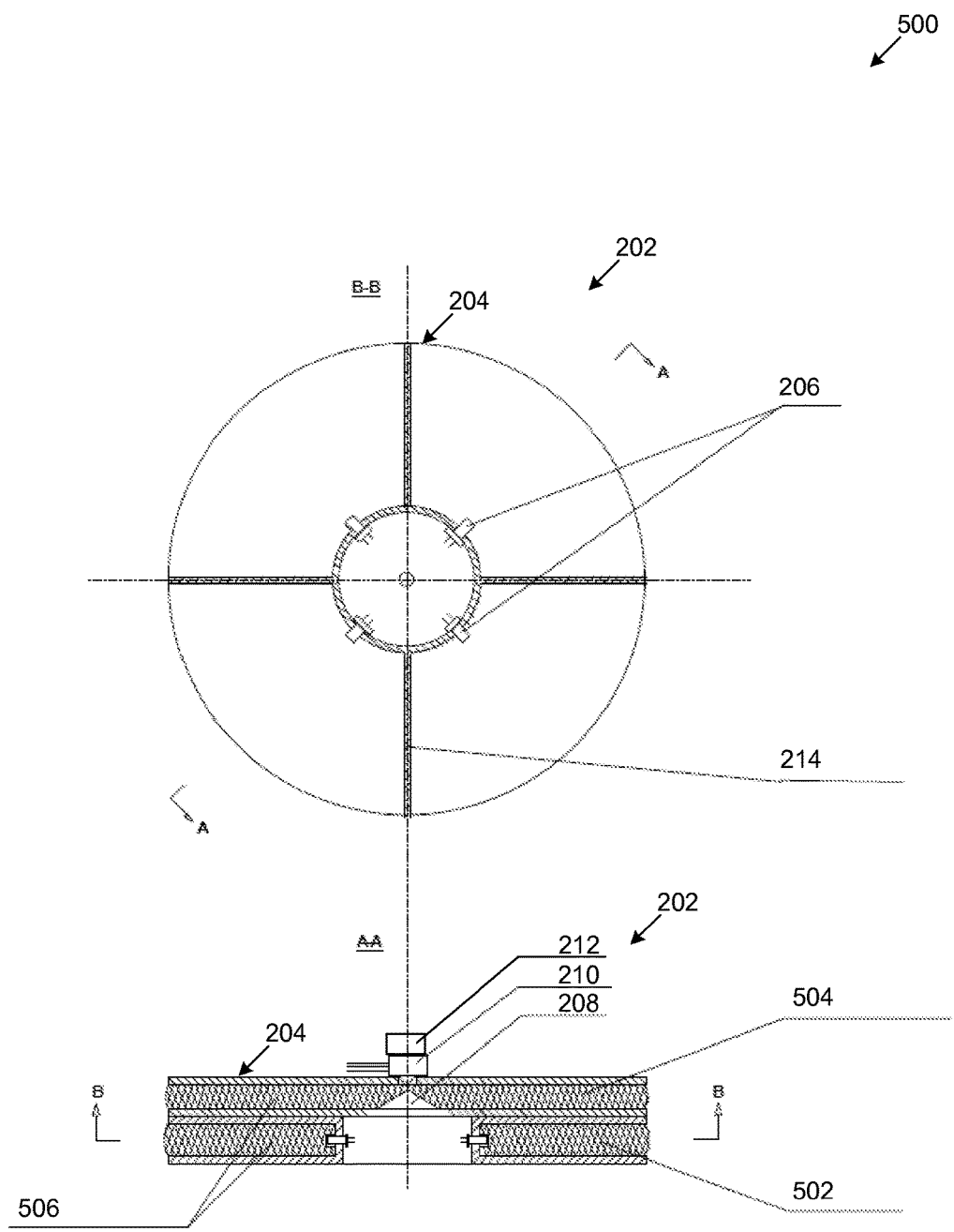
FIG. 5 is a schematic of an alternative embodiment of a proximity sensing apparatus.

FIG. 5 is a schematic 500 of an alternative embodiment of a proximity sensing apparatus 202. In this embodiment, the proximity sensing apparatus 202 includes a device housing 204, a plurality of energy emitters 206, a reflective member 208, an energy detector 210, and a controller system 212. The device housing 204 may include various structural features. Such structural features may include opaque walls 214.

The structural features may also include one or more lenses. The lenses may manipulate energy, such as by converging or diverging a beam of radiation or particles. The illustrative embodiment includes an emission lens 502 for each energy emitter 206. The emission lens 502 may aid in directing the angle of a beam of energy away from the energy emitter 206 and out to a particular sector of space adjacent to the proximity sensing apparatus 202. The illustrative embodiment also includes a reception lens 504. The reception lens 504 may aid in collecting a reflected beam of energy from a particular sector of space adjacent to the proximity sensing apparatus 202. Some embodiments include a reception lens 504 for each sector of space adjacent the proximity sensing apparatus 202. The lenses may be composed of a transparent resin 506 or other appropriate material.

In this embodiment, the reflective member 208 may be an air cavity within the transparent resin 506. The cavity may be engineered with reflective and/or refractive properties to maximize the amount of energy directed to the energy detector 210 based on the anticipated angles of incidence to the member's surface. The reflective member 208 may direct energy funneled by one of the reception lenses 504 to the energy detector 210 regardless of from which sector of space adjacent the proximity sensing apparatus 202 the energy came. As illustrated, the reflective member 208 is a right circular cone whose axis passes through the main detection surface of the energy detector 210. In some embodiments, the boundary between the reflective member 208 and the transparent resin may be coated with a reflective surface.

Figure 6:
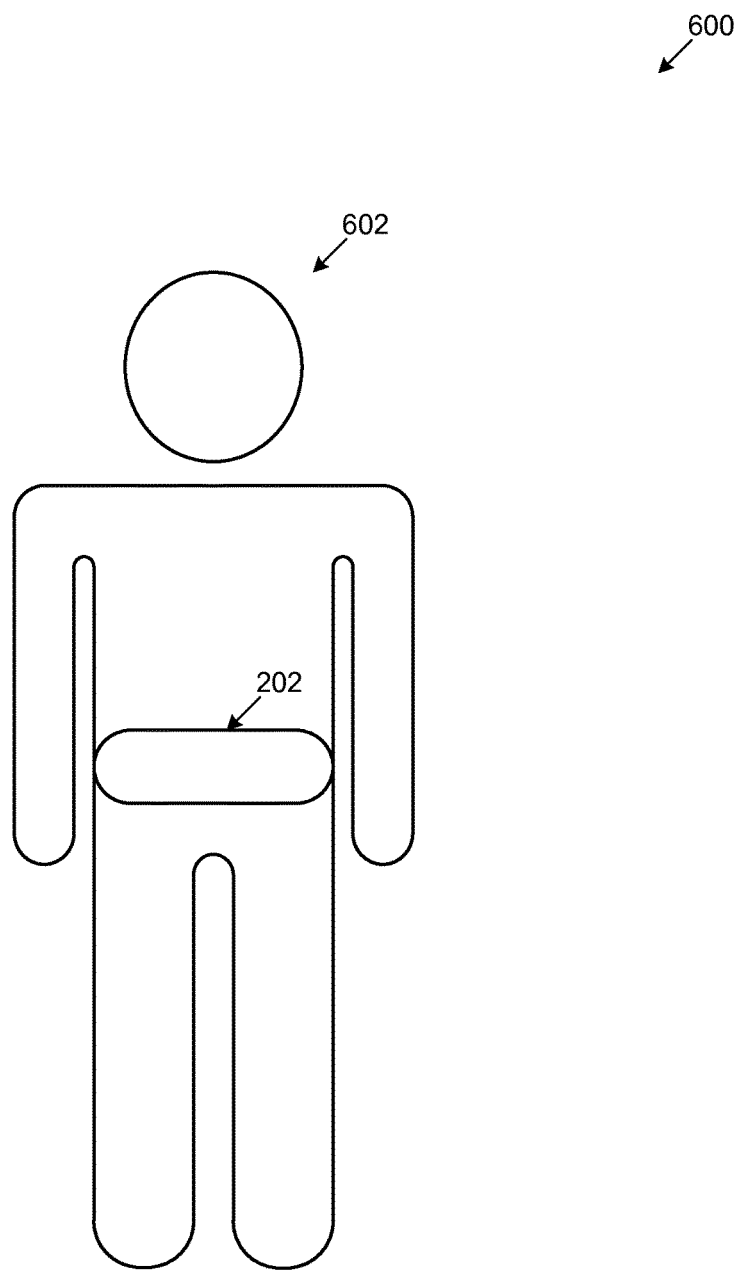
FIG. 6 is an illustration of an autonomous robot.

FIG. 6 is an illustration 600 of an autonomous robot 602. In this embodiment, the autonomous robot 602 includes a proximity sensing apparatus 202. The proximity sensing apparatus 202 may assist the autonomous robot 602 with object detection and avoidance.

Figure 7:
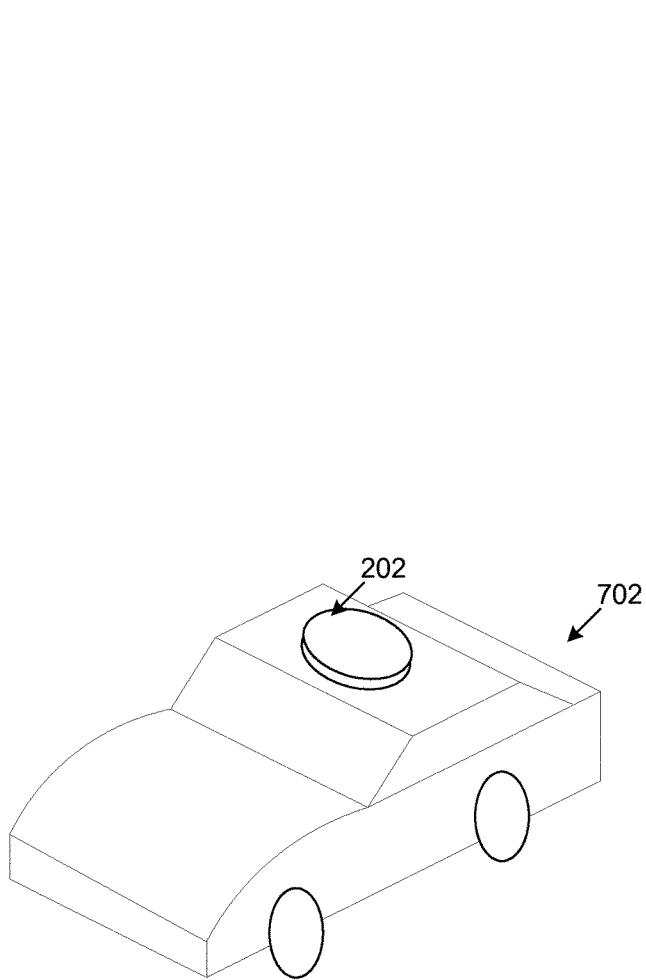
FIG. 7 is an illustration of a vehicle.

FIG. 7 is an illustration 700 of a vehicle 702. In this embodiment, the vehicle 702 includes a proximity sensing apparatus 202. The proximity sensing apparatus 202 may assist the vehicle 702 with object detection and avoidance.

While the proximity sensing apparatus 202 is illustrated in the torso of the autonomous robot 602 and on the roof of the vehicle 702, it may be located at any location on or around the robot 602 or the vehicle 702. For example, the proximity sensing apparatus 202 may be located on the head or on the feet of the robot 602 or on the undercarriage or on the front or rear bumper of the vehicle 702.

Figure 8:
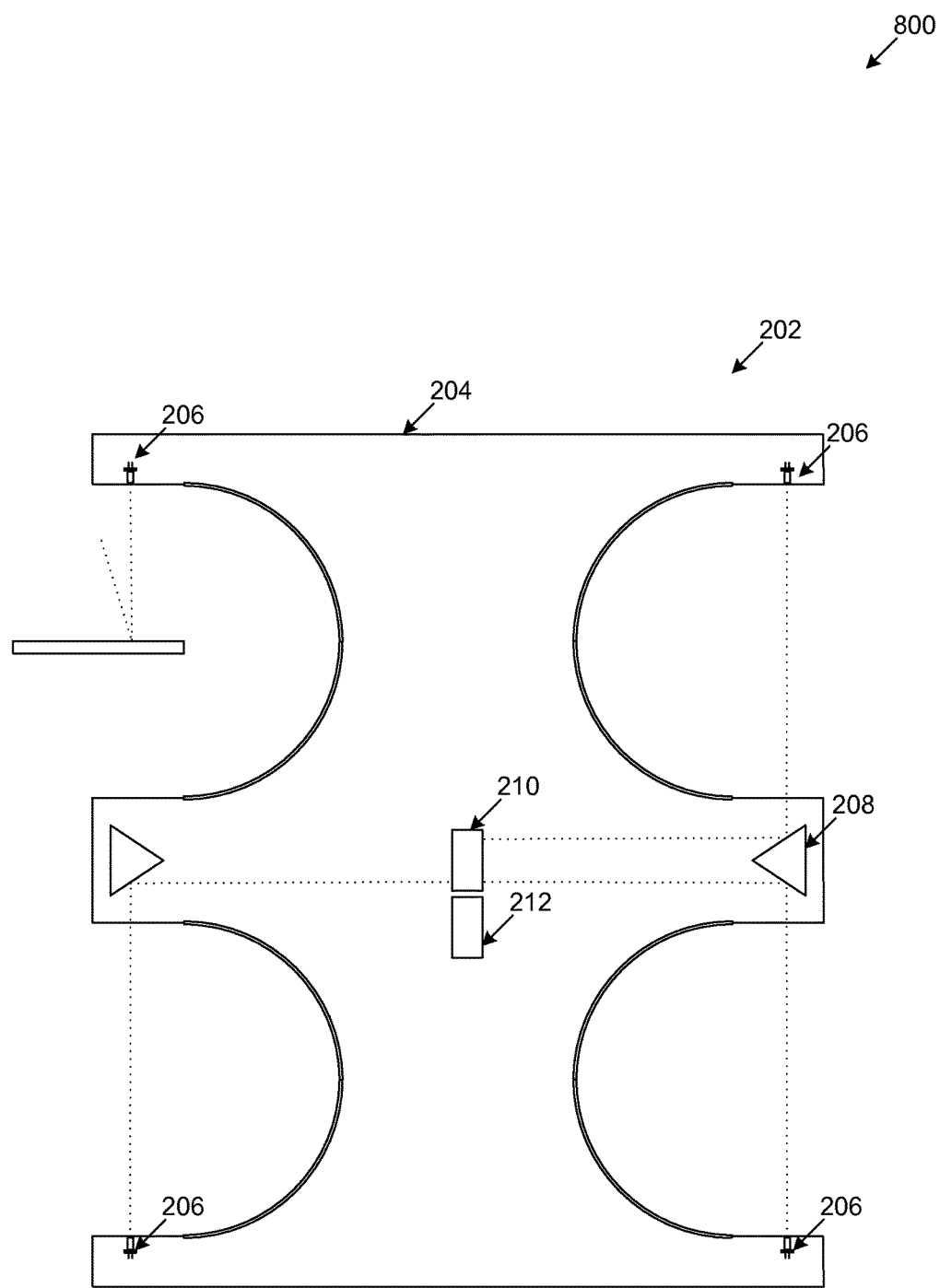
FIG. 8 is an illustration of an alternative embodiment of a proximity sensing apparatus.

FIG. 8 is an illustration 800 of an alternative embodiment of a proximity sensing apparatus 202. The proximity sensing apparatus 202 includes a device housing 204, a plurality of energy emitters 206, a reflective member 208, an energy detector 210, and a controller system 212. In the illustrated embodiment, the device housing 204 and game play may be similar to that of the LOOPZ device. However, rather than determine from which sector a reflected energy signal is received, the energy detector 210 and controller system 212 may determine from which sector a reflected energy signal is not received.

For example, the controller system 212 may signal the energy emitters 206 to activate sequentially in a time-division pattern. The emitted energy may reflect off one or more reflective members 208. Because the incidence angle of the energy is anticipated to be within a narrow range, the reflective member 208 may include a reflective planar surface. The energy detector 210 converts the received energy into electrical signals sent to the controller system 212. The controller system 212 may determine from which sector a reflected energy signal is not received and send signals to a feedback system to provide a player with feedback regarding the determination made by the controller system 212.

Figure 9:
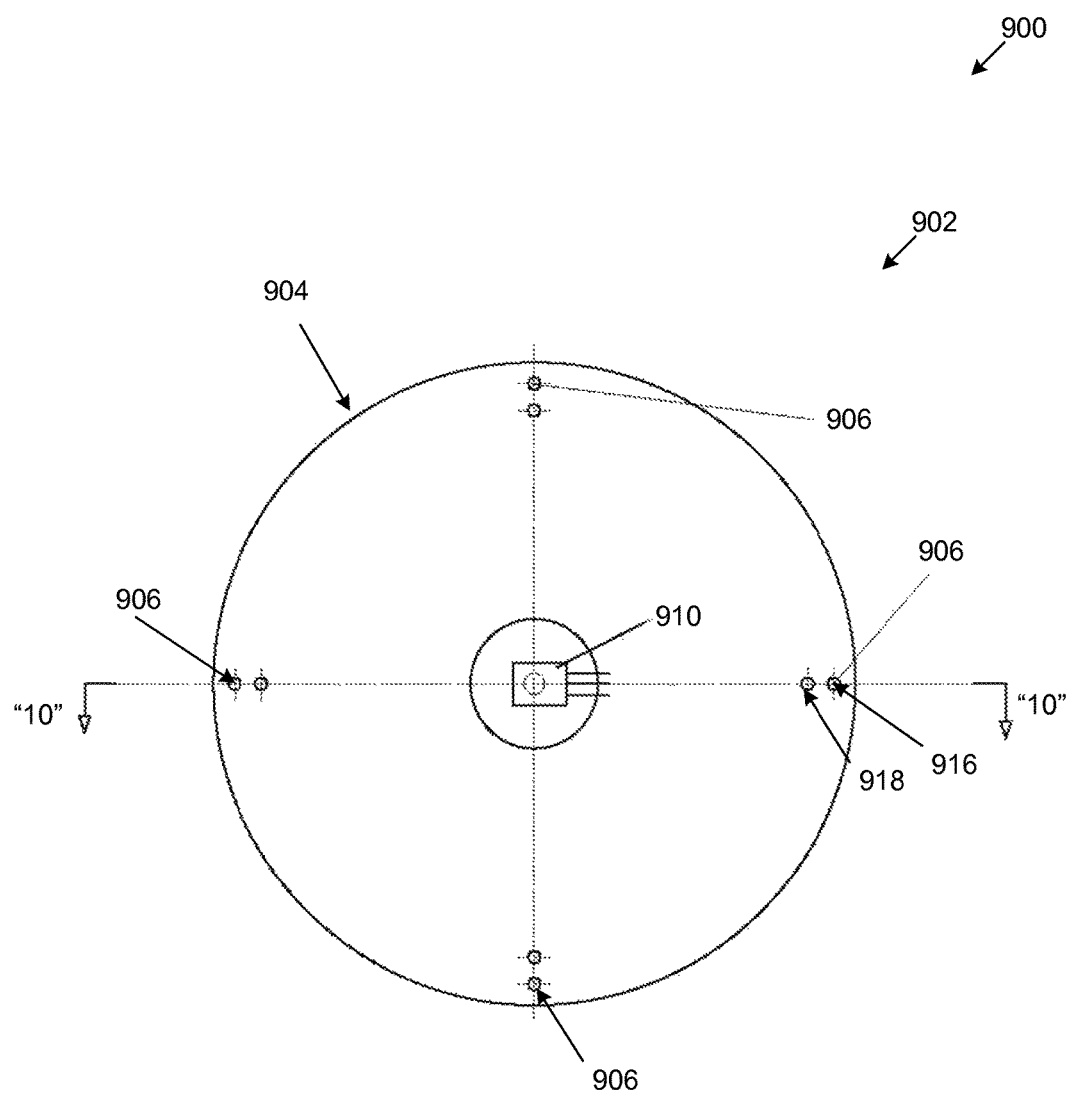
FIG. 9 is a schematic of an alternative embodiment of a proximity sensing apparatus.
Figure 10:
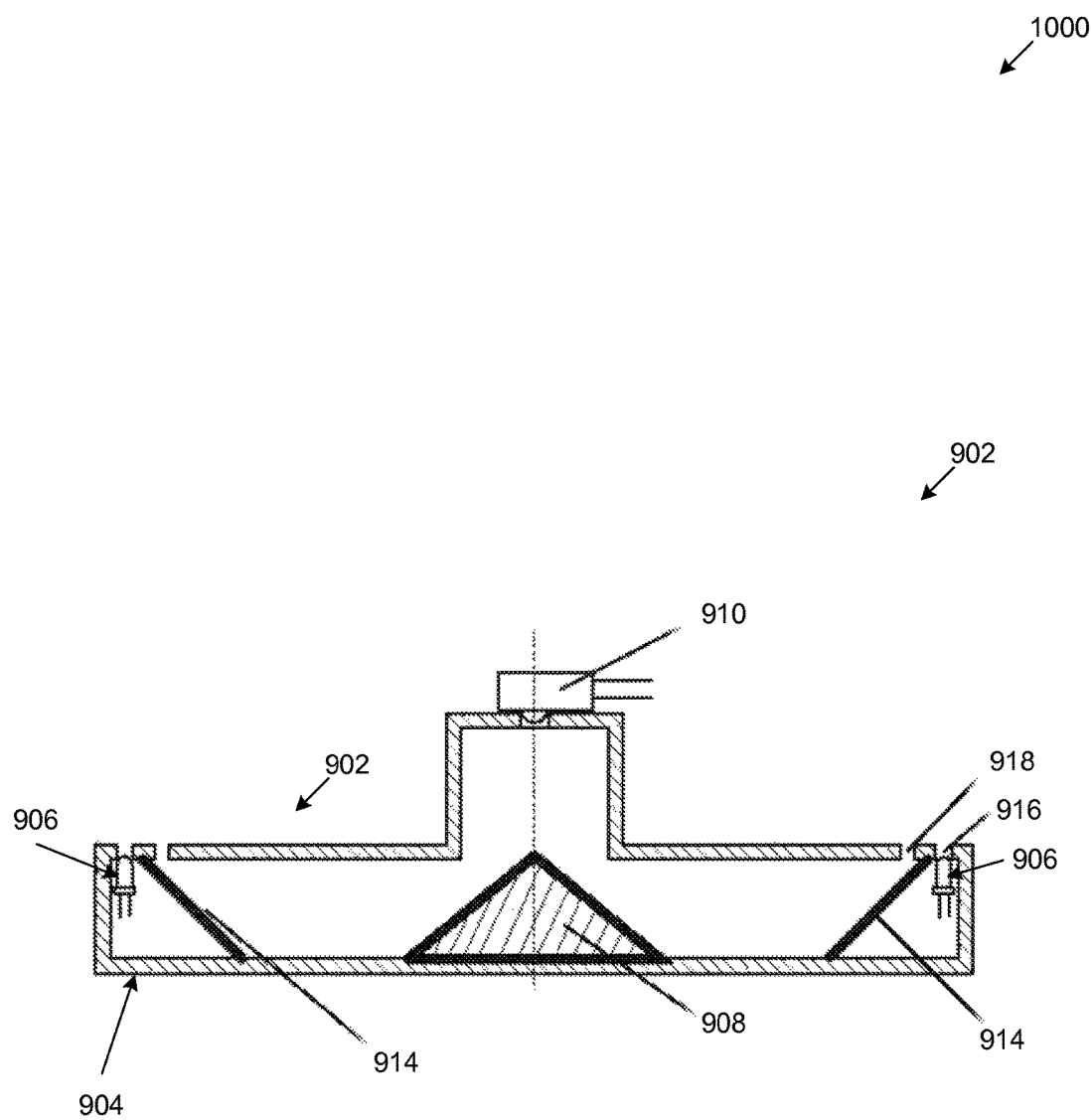
FIG. 10 is a cross-sectional schematic of the proximity sensing apparatus illustrated in FIG. 9.

FIG. 9 is a schematic 900 of another embodiment of a proximity sensing apparatus 902 and FIG. 10 is a schematic 1000 showing a cross-sectional side view of the apparatus 902, taken along the line "10"-"10." The proximity sensing apparatus 902 includes a device housing 904, a plurality of energy emitters 906 (such as LEDs), a reflective member 908 (such as a mirror cone), an energy detector 910 (such as a light sensor), and a controller (not shown in FIGS. 9 and 10). The device housing 904 provides the structural support for the proximity sensing apparatus 902. In one embodiment, the device housing 904 may be manufactured from a durable plastic, such as polyvinyl chloride (PVC), and may be formed of opaque walls.

The structural features of proximity sensing apparatus 902 may also include one or more collimators. The collimators may adapt the size and angle of a beam of radiation or particles or aid in collecting a beam of radiation or particles. In this embodiment, the apparatus 902 includes an emission collimator 916 for each energy emitter 906, even though only one collimator 916 is identified in FIG. 9 and in FIG. 10. The emission collimator 916 may aid in directing the angle of a beam of energy away from the energy emitter 906 and out to a particular sector of space adjacent to the proximity sensing apparatus 902.

In this embodiment, the apparatus 902 also includes multiple reception collimators 918, each of which is associated with a different sector of space adjacent the proximity sensing apparatus 902. In particular, each reception collimator 918 may aid in collecting a reflected beam of energy from its particular adjacent sector of space.

The energy emitters 906 direct energy into the space surrounding the proximity sensing apparatus 902. Each energy emitter may direct energy of a particular frequency, amplitude, or energy level into that space. For example, the emitted energy may be directed into a particular sector of space surrounding the proximity sensing apparatus 902. The emitted energy may be aided in its direction by particular structures in the device housing 904, such as the opaque walls and the emission collimators 916.

As discussed above, the energy may be directed according to a pre-determined frequency, amplitude, energy, or timing pattern. The pattern may aid in identifying from which of the energy emitters 906 or from which particular sector of space a received energy pattern originated. For example, the pattern may include a time-division pattern or a code-division pattern.

Proximity sensing apparatus 902 includes an internal reflective member 914 that is located in the housing 904. In this embodiment, the reflective member 914 is generally conic in shape and is a portion or slice of a cone. In this embodiment, the member 914 extends in a full circle around the inner reflective member 908. The reflective member 914 is located beneath the reception collimators 918 and angled such that the energy passing through a collimator 918 reflects off the surface of member 914 and a surface of reflective member 908, which directs the energy to the energy detector 910. A single energy detector 910 is used for the apparatus 902 which has multiple energy emitters 906, thereby eliminating the need for the apparatus 902 to have a separate detector for each emitter 906.

The reflective member 908 may be generally conic in shape and composed of or coated with a reflective material. Similarly, reflective member 914 may be composed of or coated with a reflective material. In the embodiments of the invention with optical energy emitters, such as infrared emitters, the surfaces of the reflective members 908 and 914 may be coated with aluminum or MYLAR biaxially-oriented polyethylene terephthalate polyester film from DUPONT, or composed of a shiny plastic. The shapes of the reflective members 908 and 914 may be engineered to maximize the amount of energy reflected to the energy detector 910 based on the anticipated angles of incidence to the conic surfaces.

In an alternative embodiment, the one-piece conical reflective member 914 is replaced by multiple, separate reflective members 914, each of which is located beneath a corresponding one of the reception collimators 918 and angled to direct the received energy toward reflective member 908.

Similar to energy detector 210, energy detector 910 converts received energy into electrical signals sent to the controller system of apparatus 902. The energy detector 910 may detect energy of a particular frequency, amplitude, or energy level incident on a detecting surface. In some embodiments, the energy detector 910 includes an infrared sensor. Alternatively, the energy detector 910 may detect energy of another optical bandwidth, such as ultraviolet or near-ultraviolet light, or detect sonic or ultrasonic energy, among other things.

Any one of the proximity sensing apparatus described above may be used in the estimation of the distance from the apparatus to a detected object. In one implementation, the proximity sensing apparatus uses an energy detector with a predefined sensitivity and the threshold of the incoming signal like a PIC sensor. In this implementation, the detection starts at a low level of the radiated signal and the level is increased step-by-step until either a reflected signal is detected by the detector, or the level is increased to a maximum level without any object being detected. In another implementation, the proximity sensor apparatus uses a linear or close to linear detector, such as a phototransistor or photodiode, and an analog-to-digital converter after the detector measures the level of the reflected signal, which represents the approximate distance to the detected object.

Figure 11:
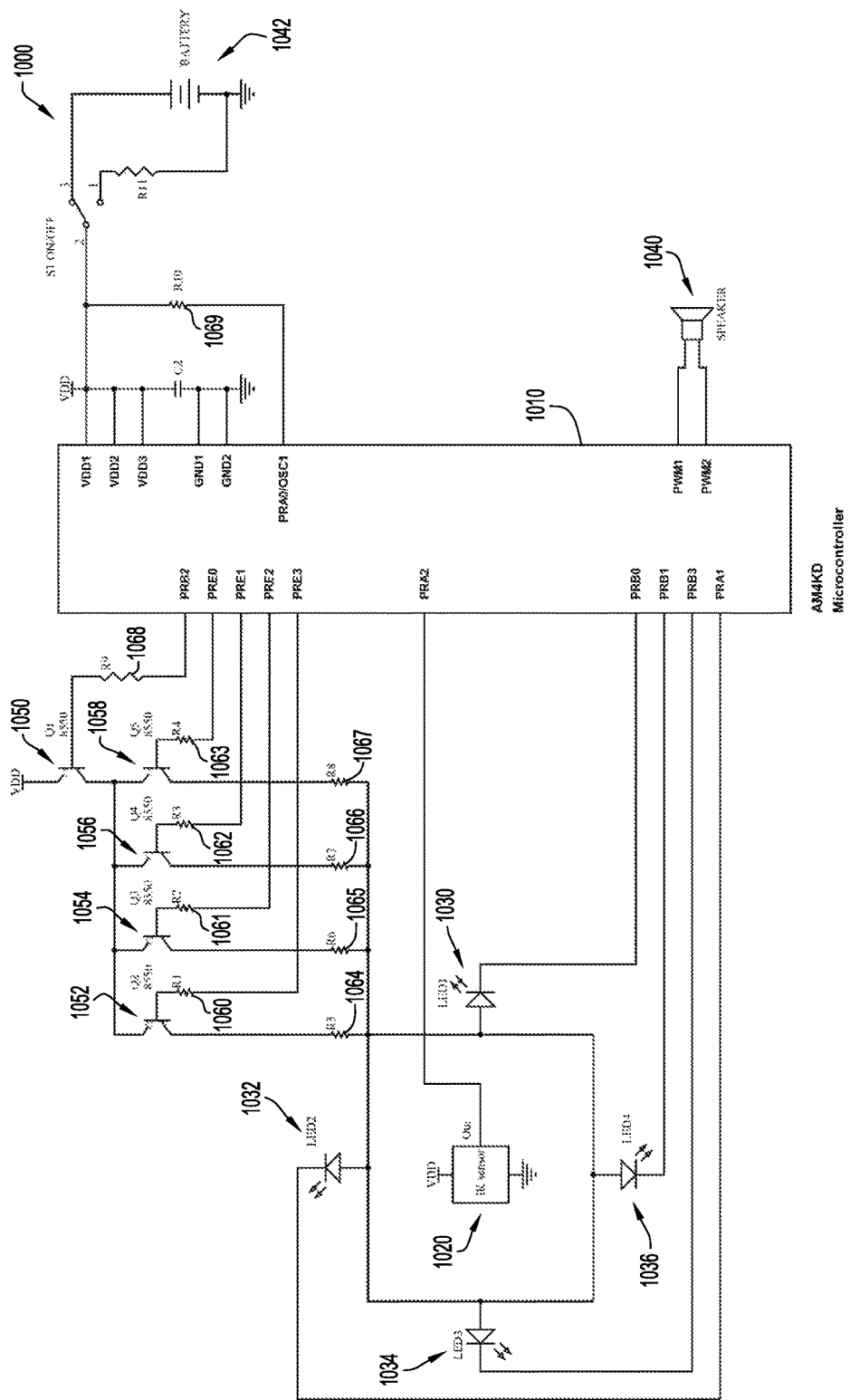
FIG. 11 is a circuit diagram for another exemplary optical proximity sensor apparatus.

Referring to FIG. 11, a circuit diagram of another embodiment of a proximity sensing apparatus is illustrated. In this embodiment, the circuit 1000 includes a microcontroller 1010, a digital IR sensor or detector 1020, four IR LEDs 1030, 1032, 1034, and 1036, a speaker 1040, and a power source 1042. In addition, the circuit 1000 includes transistors 1050, 1052, 1054, 1056, and 1058 and resistors 1060-1069 as illustrated. The transistors 1050, 1052, and 1054 form a controllable source of current by switching resistors 1067 and 1068. The four resistor arrangement in circuit 1000 provides the possibility to have 16 different levels of current applied to the LEDs and used for distance estimation. Transistor 1050 provides a high frequency modulation of the current for the LEDs 1030, 1032, 1034, and 1036, which in this embodiment is 37.9 kHz.

One exemplary process of detecting an object and estimating the distance to the object uses the proximity sensing apparatus illustrated in FIG. 11. In this process, one of the PRB ports is set low and the PRB2 output is modulated at 37.9 kHz. The lowest current for one of the LEDs, such as LED 1030, is then established by setting the port PRE to number 1. In circuit 1000, one of the outputs of the port PRE that controls the transistor with the highest resistor value is set to a low level and all other outputs of this port PRE are set to a high level. At this point, the detector 1020 is checked to determine if an output signal is present. If there is no output signal present (meaning, no reflected light has been detected), the output code of port PRE is changed to number 2, which results in an increase in the current through the LED 1030. The detector 1020 is checked again to determine if reflected energy is being received and an output signal is being generated. If no such signal is present, the output code of port PRE is changed to another number or level, and the process of checking for an output signal from the detector 1020 is repeated. Once an output signal is detected, the code set on port PRE reflects, and can be used to interpret, the distance to the detected object. For a particular LED, once either the detecting of an object occurs or the maximum predefined current level through the LED is reached, the procedure is repeated for each of the other LEDs 1032, 1034, and 1036.

Figure 12:
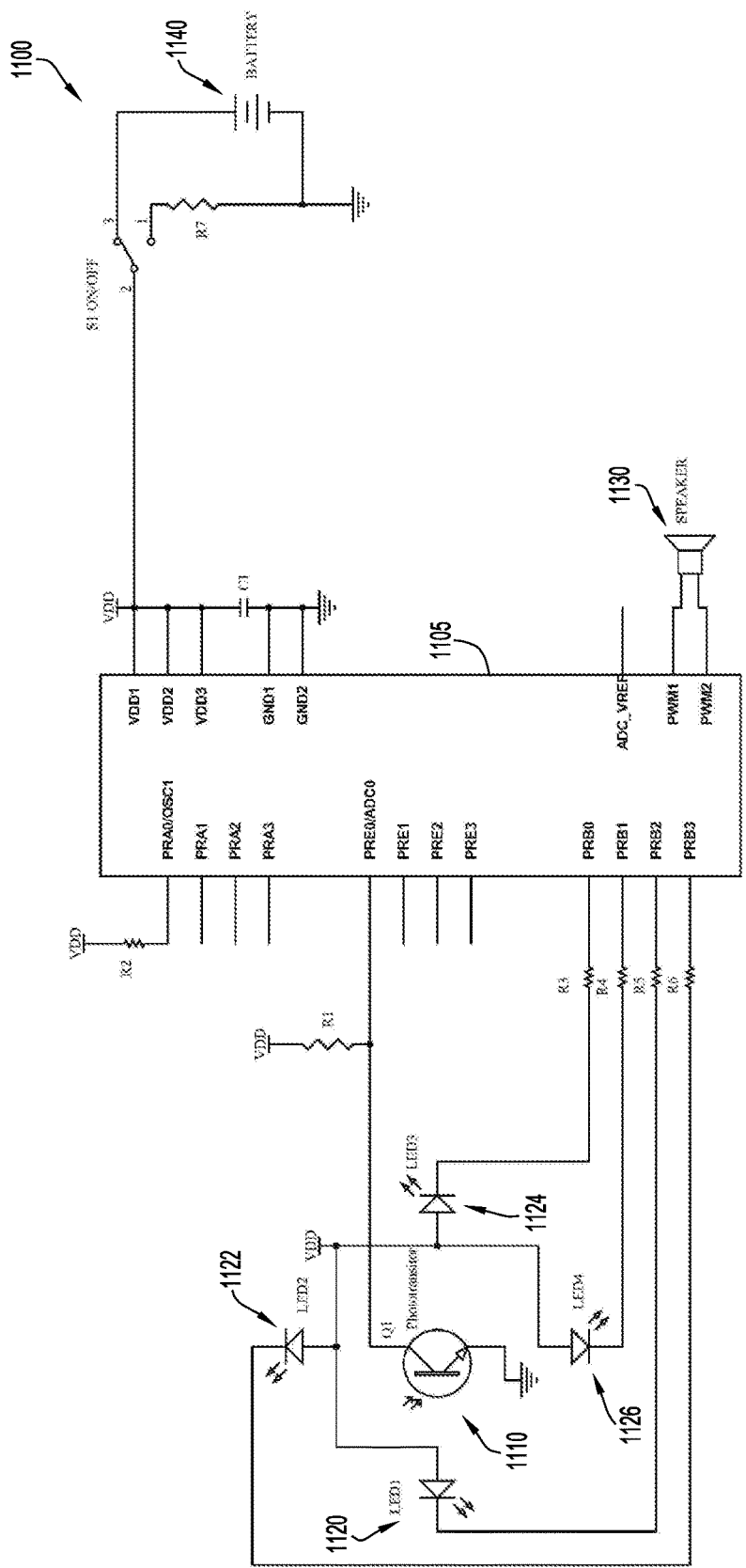
FIG. 12 is a circuit diagram for another exemplary optical proximity sensor apparatus.

Referring to FIG. 12, a circuit diagram of another embodiment of a proximity sensing apparatus is illustrated. The apparatus is useable for distance estimation and includes an analog IR detector. In this embodiment, the circuit 1100 includes a microcontroller 1105, a phototransistor 1110, four IR LEDs 1120, 1122, 1124, and 1126, a speaker 1130, and a power source 1140. In this embodiment, the microcontroller 1105 includes an embedded analog-to-digital converter. The microcontroller 1105 sequentially activates LEDs 1120, 1122, 1124, and 1126 in a continuous manner, and measures at each step or activation the level of signal from the phototransistor 1110 that corresponds to the luminance of the IR detector 1110 by reflected light. If reflected light is detected, the microcontroller 1105 produces an output, such as an audible output of one or more sounds, that depends on the direction from which the signal is detected as well as the level of the detected signal.

The orientation of a proximity sensing apparatus according to the present invention can vary depending on different uses of the apparatus. For example, a proximity sensing apparatus, such as apparatus 202 or 902, may be oriented so that the energy emitters are located generally in a horizontal plane. As a result, an object may be detected by the apparatus relative to the apparatus vertically. Alternatively, the proximity sensing apparatus may be oriented so that the energy emitters are located generally in a vertical plane. In this orientation, an object may be detected by the apparatus by the apparatus relative to the apparatus horizontally.

In different embodiments, the proximity sensing apparatus may be used to control the outputs of an audio generating mechanism. The audio generating mechanism may be used to generate audio outputs, including sounds or music, such as notes from one or more musical instruments. The energy received by the detector is used as inputs to control the outputs of the audio generating mechanism. In one embodiment, each of the energy emitters is associated with one of musical characteristic, such as tone, pitch, tempo, volume, etc. As energy from an emitter is reflected and received by the detector, the particular musical characteristic associated with that emitter changes in response to detected movement of an object. For example, for one emitter, the generated signal relates to the volume of the music which varies based on the distance of the object from the apparatus. For a change in the detected energy from another emitter, the pitch of the music changes.

It is believed that the disclosure set forth above encompasses multiple distinct inventions with independent utility. While each of these inventions has been disclosed in a preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any description recites "a" or "a first" element or the equivalent thereof, such disclosure should be understood to include incorporation of one or more such elements, neither requiring nor excluding two or more such elements.

While various embodiments of the proximity sensing apparatus have been described, it will be apparent to those of ordinary skill in the art that many more embodiments and implementations are possible within the scope of the invention. Thus, it is intended that the present invention covers modifications and variations of this invention provided they come within the scope of the appended claims and their equivalents. For example, the majority of the elements can be formed of molded plastic. However, in alternative embodiments, the elements can be formed of a material other than plastic provided that the material has sufficient strength for the component's intended function.

Exemplary descriptions of the present invention include the following:

A proximity sensing apparatus comprising: a device housing; a plurality of energy emitters attached to the device housing such that each energy emitter emits energy to a different area outside the device housing than any other of the energy emitters; an energy detector attached to the device housing; a reflector positioned with respect to the device housing such that reflections of the emitted energy from one or more objects reflect off the reflector and are directed to the energy detector; and a controller system operably coupled to the energy emitters and the energy detector, the controller system selectively activating the energy emitters, receiving data from the energy detector, and processing the received data to determine a position of the one or more objects.

The proximity sensing apparatus above, where the energy detector is centrally located on the device body with respect to the plurality of energy emitters.

The proximity sensing apparatus above, where the reflector is centrally located on the device body with respect to the plurality of energy emitters.

The proximity sensing apparatus above, where the energy emitters are positioned symmetrically with respect to the device housing.

The proximity sensing apparatus above, where each of the energy emitters emit energy to a different sector of space from the device housing, the emitted energy extending in a radially symmetrical pattern around the device housing.

The proximity sensing apparatus above, where the energy is infrared light.

The proximity sensing apparatus above, where the controller system selectively activates the energy emitters by sending signals to the energy emitters to modulate the emitted energy.

The proximity sensing apparatus above, where each energy emitter activates at a different time than the other energy emitters.

The proximity sensing apparatus above, where energy from each energy emitter includes a unique frequency pattern with respect to energy from the other energy emitters.

A game kit including one of the proximity sensing apparatuses above.

An autonomous robot including one of the proximity sensing apparatuses above.

A vehicle including one of the proximity sensing apparatuses above.

The proximity sensing apparatus above further comprising a feedback system operatively coupled to the controller system that provides feedback about the determined position of the one or more objects.

The proximity sensing apparatus above, where the reflector includes a reflective cone.

What is claimed is:

1. A proximity sensing apparatus comprising:
   a device housing;
   a plurality of energy emitters attached to the device housing such that each energy emitter emits energy to a different area outside the device housing than any other of the energy emitters;
   a single energy detector attached to the device housing;
   a reflector attached to the device housing and positioned such that emitted energy reflected back towards the device housing by one or more objects subsequently deflects off the reflector towards the single energy detector; and
   a controller system operably coupled to the energy emitters and the single energy detector, the controller system configured to selectively activate the energy emitters, receive data from the single energy detector, and process the received data to determine a position of the one or more objects.

2. The proximity sensing apparatus of claim 1, where the single energy detector is centrally located on the device housing with respect to the plurality of energy emitters.

3. The proximity sensing apparatus of claim 1, where the reflector is centrally located on the device housing with respect to the plurality of energy emitters.

4. The proximity sensing apparatus of claim 1, where the controller system determines a distance of the one or more objects from the device housing.

5. The proximity sensing apparatus of claim 1, where each of the energy emitters emit energy to a different sector of space from the device housing.

6. The proximity sensing apparatus of claim 1, where the energy is infrared light.

7. The proximity sensing apparatus of claim 1, where the controller system selectively activates the energy emitters by sending signals to the energy emitters to modulate the emitted energy.

8. The proximity sensing apparatus of claim 1, where each energy emitter activates at a different time than the other energy emitters.

9. The proximity sensing apparatus of claim 1, where energy from each energy emitter includes a unique frequency pattern with respect to energy from the other energy emitters.

10. The proximity sensing apparatus of claim 1 further comprising a feedback system operatively coupled to the controller system that provides feedback about the determined position of the one or more objects.

11. The proximity sensing apparatus of claim 1, where the reflector includes a reflective cone.

12. The proximity sensing apparatus of claim 1, where the reflector includes an air cavity.

13. The proximity sensing apparatus of claim 1 further comprising one or more lenses.

14. An autonomous robot including the proximity sensing apparatus of claim 1.

15. A vehicle including the proximity sensing apparatus of claim 1.

16. A game kit comprising:
   a game kit housing;
   a plurality of energy emitters attached to the game kit housing such that each energy emitter emits energy to a different area outside the game kit housing;
   a single energy detector attached to the game kit housing;
   a reflector attached to the game kit housing and positioned such that emitted energy reflected back towards the game kit housing by one or more objects subsequently deflects off the reflector towards the single energy detector; and
   a controller system operably coupled to the energy emitters and the single energy detector, the controller system configured to selectively activate the energy emitters, receive data from the single energy detector, and process the received data to determine a position of the one or more objects.

17. A method of sensing proximity using a proximity sensing apparatus, the method comprising:
   sending energy signals from energy emitters located around a reflective member on a device housing, wherein each of the energy emitters sends one or more of the energy signals to a different sector of space around the device housing at different times, such that the energy emitters sequentially send the energy signals radially outward away from the reflector;
   deflecting at least one energy signal of the energy signals with the reflective member subsequent to the at least one energy signal being reflected back toward the housing by an object in the space;
   receiving the at least one energy signal with a single energy detector subsequent to the deflecting;
   processing data associated with the at least one energy signal received by the single energy detector with a controller system; and
   producing feedback based on the processed data.

18. The method of claim 17 where receiving includes channeling the at least one energy signal from multiple sectors of the space to the single energy detector subsequent to the deflecting.

19. The method of claim 17 where processing data associated with the at least one energy signal includes identifying a time-division pattern for the at least one energy signal.

* * * * *